(12) United States Patent
Link

(10) Patent No.: US 6,533,151 B1
(45) Date of Patent: Mar. 18, 2003

(54) ACCESSORY CONTAINER SYSTEM

(75) Inventor: Donald J. Link, Shakopee, MN (US)

(73) Assignee: Skirts Plus, Inc., Savage, MN (US)

( * ) Notice: Subject to any disclaimer, the term of this patent is extended or adjusted under 35 U.S.C. 154(b) by 0 days.

(21) Appl. No.: 09/565,435

(22) Filed: May 5, 2000

(51) Int. Cl.$^7$ ............................................. A45F 5/00
(52) U.S. Cl. ................... 224/251; 224/249; 220/23.4; 220/23.83; 248/312.1; 206/315.11
(58) Field of Search ............................... 224/920, 249, 224/251; 248/312.1; 220/23.4, 23.2, 23.83, 23.86; 206/315.11

(56) References Cited

U.S. PATENT DOCUMENTS

| | | | | |
|---|---|---|---|---|
| 2,548,080 A | * | 4/1951 | Thorn | 224/920 X |
| 3,115,287 A | * | 12/1963 | McGrew | 224/920 X |
| 3,819,095 A | * | 6/1974 | Snyder | 224/249 |
| 4,049,165 A | * | 9/1977 | Goldhaft | 224/920 X |
| 4,323,181 A | * | 4/1982 | Spasoff | 224/920 X |
| 4,383,385 A | * | 5/1983 | Myers | 224/920 X |
| 5,005,721 A | * | 4/1991 | Jordan | 220/23.4 |
| 5,425,196 A | * | 6/1995 | Schwarze | 224/920 X |
| 5,720,406 A | * | 2/1998 | Fassbind et al. | 220/23.4 |
| 5,761,845 A | * | 6/1998 | Bartholomew | 224/920 X |

\* cited by examiner

Primary Examiner—Stephen K. Cronin
(74) Attorney, Agent, or Firm—Altera Law Group, LLC

(57) ABSTRACT

A storage container system adapted to support a number of open-ended storage tubes. A lanyard, retainer clips and/or tethered paraphernalia (e.g. forceps, fingernail clippers, scissors, magnifying glass etc.) are supported to appending arms. Loops and/or sleeves at the carrier compressively contain bobbers, forceps, scissors and other relatively long stemmed items. Relatively large loops can project from the carrier to contain other detachable film canisters. Internal vent channels and ports at the carrier or the tubes can communicate with the atmosphere to vent moisture from the tubes. In lieu of fitting each tube to a bore, projecting cap pieces can contain the tubes to the carrier.

30 Claims, 10 Drawing Sheets

ACCESSORY CONTAINER SYSTEM

BACKGROUND OF THE INVENTION

The present invention relates to storage containers and, in particular, to a user mounted container system for conveniently storing fishing tackle, small parts and the like.

A problem encountered by fisherpersons or other individuals who desire to carry a number of small items is that of conveniently storing the items. For example, a fisherperson may want to store lures, hooks, sinkers, bobbers, bobber stops, fingernail clippers/line cutters, forceps/hook removers, hook eye cleaners, among other accessories. The problem is especially troublesome to those who desire to be mobile, such as when wading, shore fishing or ice fishing. Relatively large tackle boxes can be carried, but the economic risks of losing significant amounts of tackle can be great with accidental spillage. A more portable container assembly is therefore desired.

For most circumstances, only a relatively few items need to be carried. Although a variety of hinge covered, multi-compartmented, molded plastic containers can be used, the compartments frequently do not accommodate long and/or bulky accessories such as bobbers and forceps. Roll-up fabric containers and commercially available threaded, stackable tubular storage containers also experience the same problem. All of the foregoing containers also typically require the fisherperson to separately carry the container in an available pocket, backpack or vest.

A variety of user supported, lanyard and clip mounted assemblies have been developed specifically for the fisherperson. These assemblies typically include various arrangements of forceps, fingernail clippers, magnifying glasses, hook eye busters, and/or other tools. The lanyards are typically worn from the neck. Otherwise, available retainer clips and spring-biased tethers can support the tools to the belt or other items of clothing. Each accessory tool is thereby made available with relatively little encumbrance to the fisherman.

The foregoing assemblies, however, do not contain the fishing tackle or other small items. Some relatively small, hinge covered plastic containers that provide a number of covered compartments are available that are also mounted to a lanyard. The single lid that covers the storage compartments, however, is susceptible to accidental release and the consequent risk of spilling the costly contents.

The storage assemblies of the present invention were developed to provide an inexpensive portable storage system for a fisherperson. The assemblies are also useful for other users desiring a portable, hands-free storage system (e.g. for pins, needles, screws, nuts etc.). A length adjustable lanyard or tether, among a variety of retainers, is secured to an elastomer carrier that supports a number of separate transparent storage tubes or containers that plug-mount to the carrier. The tubes contain miscellaneous items. Loops, tabs and other appendages project from the carrier and support fingernail clippers, weights, forceps, bobbers, hand-tools and other fishing paraphernalia. A live bait container can also be mounted to the carriers.

SUMMARY OF THE INVENTION

It is a primary object of the invention to provide a storage assembly that contains miscellaneous utility items for a fisherperson or other users.

It is a further object of the invention to provide an elastomer carrier having a number of projecting appendages that accept and support a length adjustable lanyard or other user retainer to tether the carrier to a user and support a variety of small items, tools and appliances (e.g. forceps, scissors, magnifying glass, among other paraphernalia).

It is a further object of the invention to provide a carrier having projecting loops that compressively retain forceps, scissors, bobbers, film canisters etc. to external surfaces of the carrier.

It is a further object of the invention to provide a carrier that accepts a number of transparent storage tubes and that may also include vents to each tube hole and/or cap piece that mounts into the tubes to secure the tubes to the carrier.

The foregoing objects, advantages and distinctions of the invention, among others, are obtained in a number of presently preferred constructions that each provide an elastomer storage container carrier. A number of bores at the carrier accept plug-mounted, open-ended storage tubes. Fore and aft carrier appendages attach to a lanyard, retainer clips, a chain and/or other tethered paraphernalia (e.g. forceps, scissors, magnifying glass). Loops and/or a sleeve at the carrier compressively contain relatively long stem items, such as bobbers, forceps, scissors, tools etc. Relatively large loops can project from the carrier to contain detachable film canisters that support a variety of larger items. The body of the carrier can also include a cavity or bore that receives a larger container such as for live bait. Internal vent channels and ports at the carrier or holes in the containers can communicate with the atmosphere to vent moisture from the tubes. Projecting cap pieces that mount internal to each tube can also be used alone or in combination with the bores to contain the tubes to the carrier.

Still other objects, advantages and distinctions of the invention will become more apparent upon reference to the following detailed description with respect to the appended drawings. Similar components and assemblies shown at the various drawings are referred to with similar alphanumeric reference characters. To the extent various modifications and improvements have been considered, they are described as appropriate.

DESCRIPTION OF THE PREFERRED EMBODIMENTS

Figure 1:
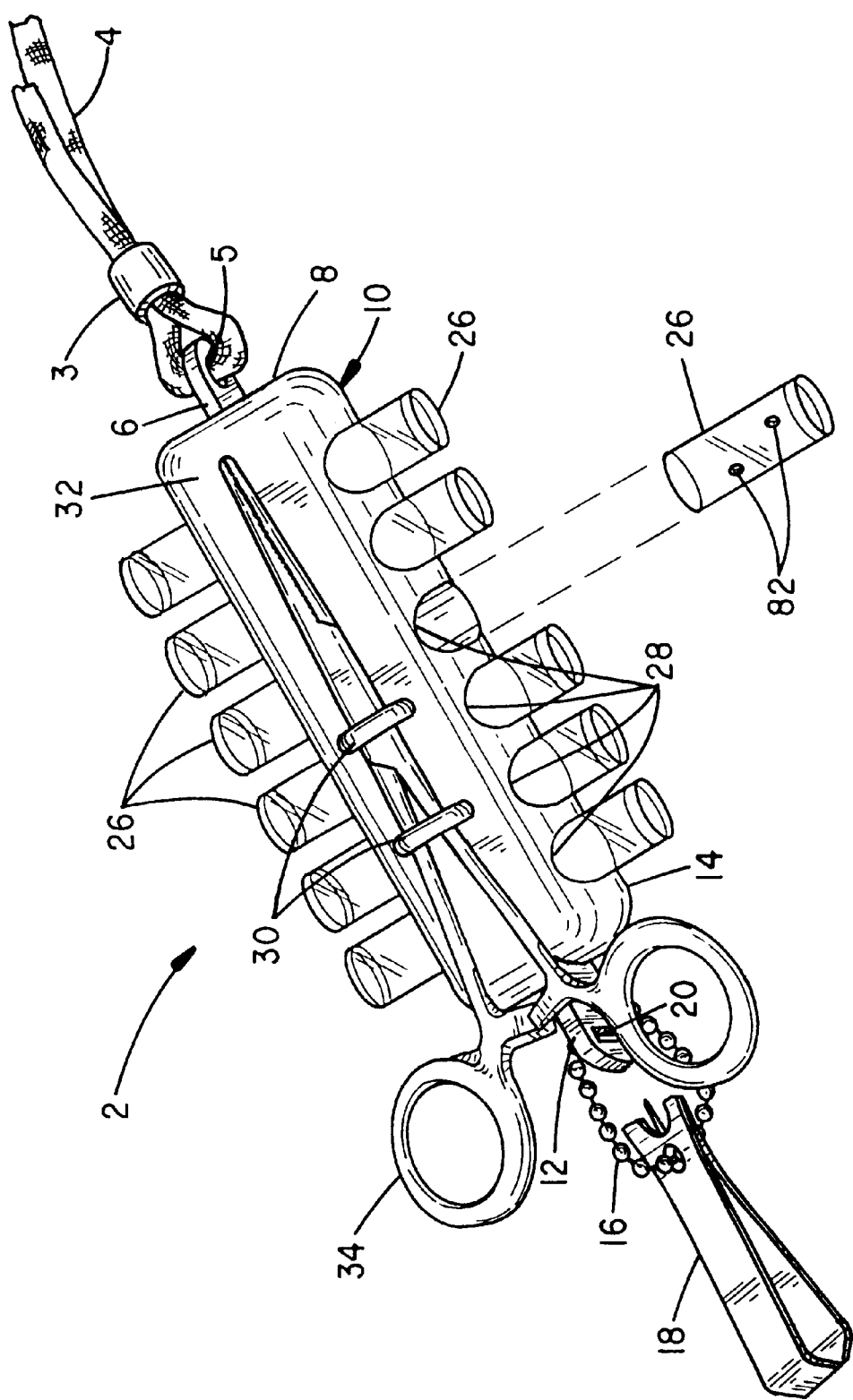
FIG. 1 is a perspective view showing an exploded assembly drawing of a carrier outfitted for a fisherman with a forceps and line cutter/eye buster.
Figure 2:
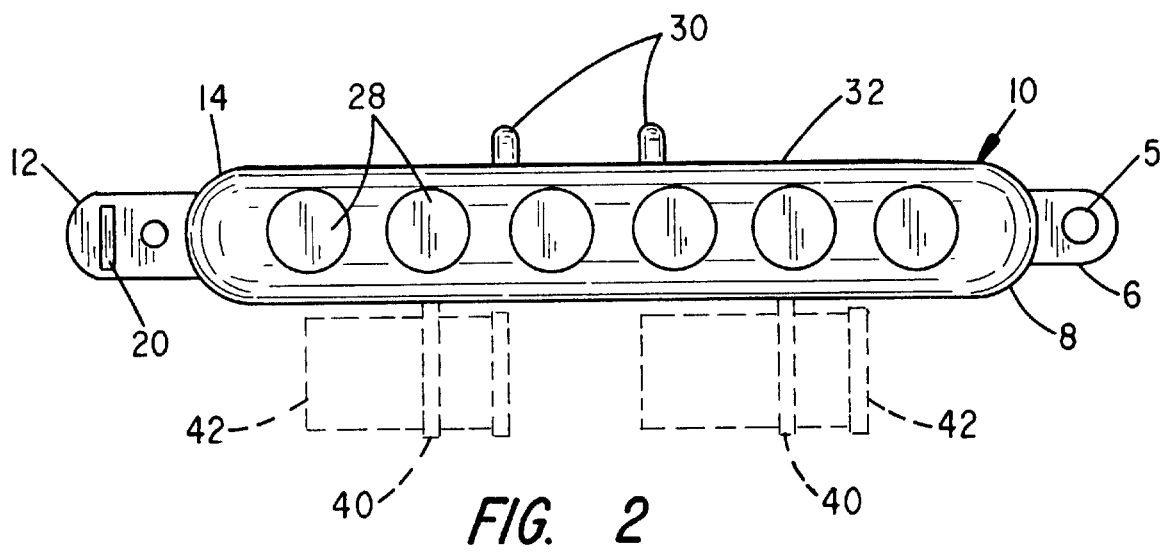
FIG. 2 shows a front view of the carrier of FIG. 1.
Figure 3:
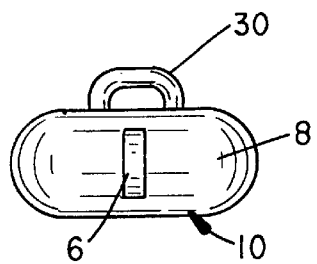
FIG. 3 shows a right side view of the carrier of FIG. 1.
Figure 4:
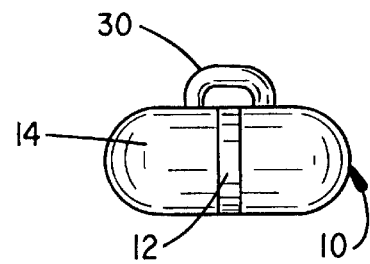
FIG. 4 shows a left side view of the carrier of FIG. 1.
Figure 5:
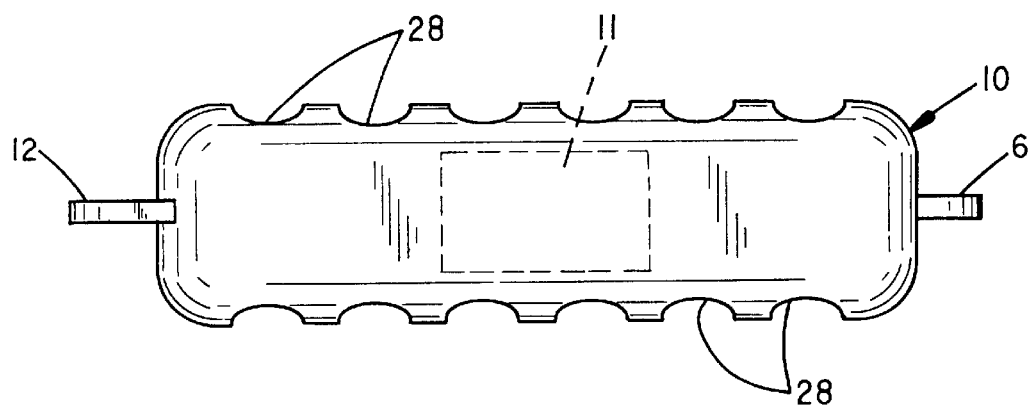
FIG. 5 shows a bottom view of the carrier of FIG. 1.

Referring to FIGS. 1 through 5, a perspective drawing is shown to a portion of a storage assembly 2 of the invention that is designed for a typical fisherperson. A length adjustable strap or lanyard 4 that mounts about a user's wrist or neck is attached to a bore 5 of an appending arm 6 at a fore end 8 of an elastomer carrier 10. One or more cinch beads 3 determine the loop size of the lanyard 4. A variety of other tethers, including chains and retainer clips can alternatively be secured to the arm 6 to retain the carrier 10 to a user. Mating hook and loop material 11, such as VELCRO, can also be used to secure the carrier 10 to the user or to any convenient surface, reference FIG. 5.

Figure 10:
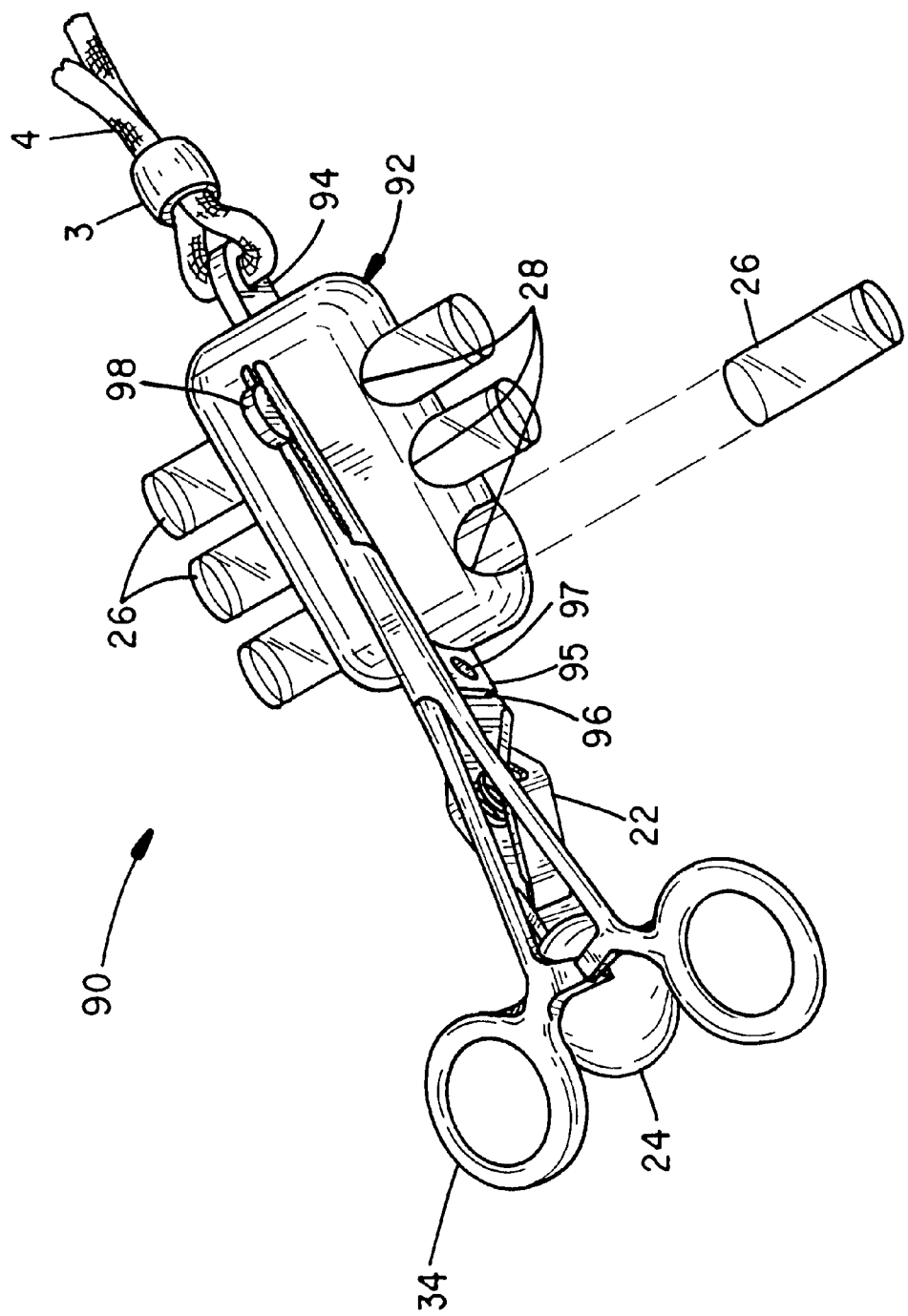
FIG. 10 shows another alternative carrier in exploded assembly that supports fewer storage tubes.
Figure 11:
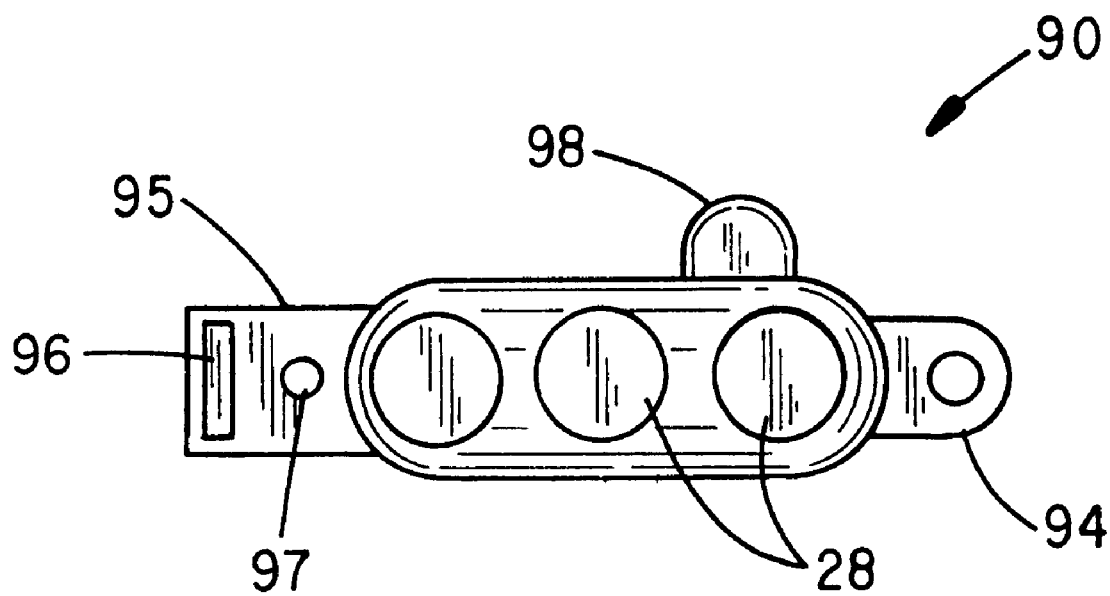
FIG. 11 shows a front view of the carrier of the carrier of FIG. 10.

A second arm 12 extends from an aft end 14 and supports a chain 16 and an attached fish line cutter-paint removal tool 18. A notch 20 is provided at the arm 12 to accept the prongs of an alligator clip 22 and attached weight 24 that is commonly used to check water depth, such as when ice fishing, reference FIG. 10.

A number of transparent open-ended tubes 26 are retained to the carrier 10 at a series of bores 28 let into the sides of the carrier 10. Tubes 26 of a variety of different sizes and shapes can be used with the carrier 10, for example, ⅜×1⅛ inch or ½×1½-inch cylindrical tubes are presently preferred. The tubes 26 are used to contain one or more lures, sinkers, hooks, bobber stops, beads, floats and various other paraphernalia used by a fisherperson. Whatever the item, the contents are visible to the user and are readily accessible upon withdrawing the tubes 26 from the carrier 10. The diameter and depth of the bores 28 are sized to assure the tubes 26 are held fast under normal conditions. Because the carrier 10 is molded from rubber, a friction fit is obtained to each tube 26.

A pair of loops 30 project from a flat longitudinal surface 32 and retain a pair of forceps 34. The forceps 34 are used to remove hooks from fish and are compressively held by the loops 30. A variety of other long stemmed implements and accessories can also be secured to the loops 30, such as scissors or a bobber 36, reference FIG. 9. Other large diameter loops 40 are shown in dashed line that might be included at the carrier 10 and that might be used to support other containers such as film canisters 42, also shown in dashed line.

The carrier 10 is molded from a resilient material, such as natural rubber, latex rubber or silicone rubber. Such materials are durable and readily accept a variety of pigments and other surface ornamentation to accentuate consumer appeal. The material accommodates the normally intended, outdoor environment and also allows the bores 28 to stretch and compress over the tubes 26 during mounting. As will become apparent below, the size of the carrier 10 can be varied as desired. The carrier 10, however, presently exhibits a nominal 6-inch length, a 1¼-inch width and a ¾-inch thickness.

Figure 6:
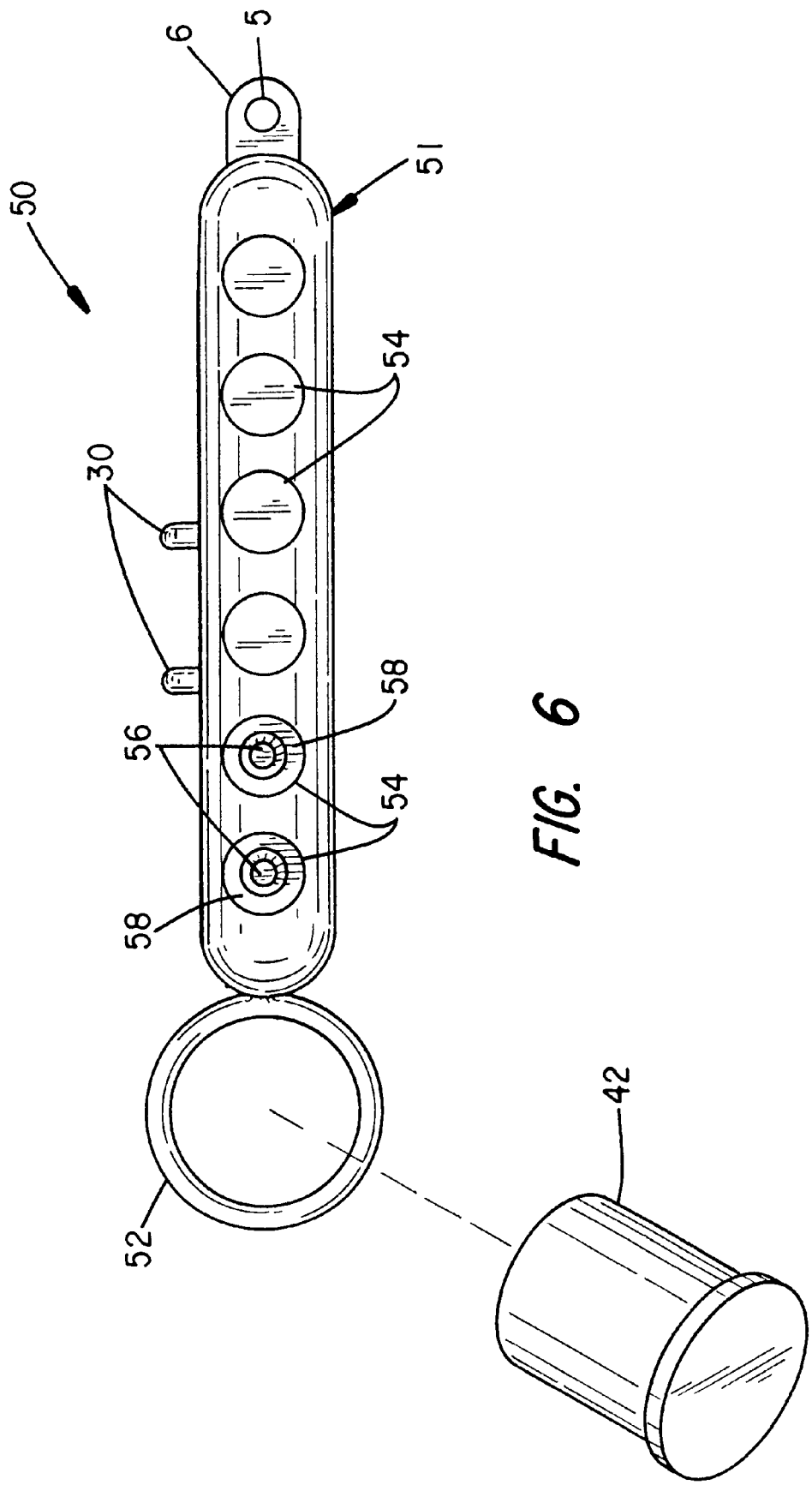
FIG. 6 shows a front view to a carrier similar to the carrier of FIG. 1 but including a relatively large accessory loop at one end and a separate container that mounts thereto.
Figure 12:
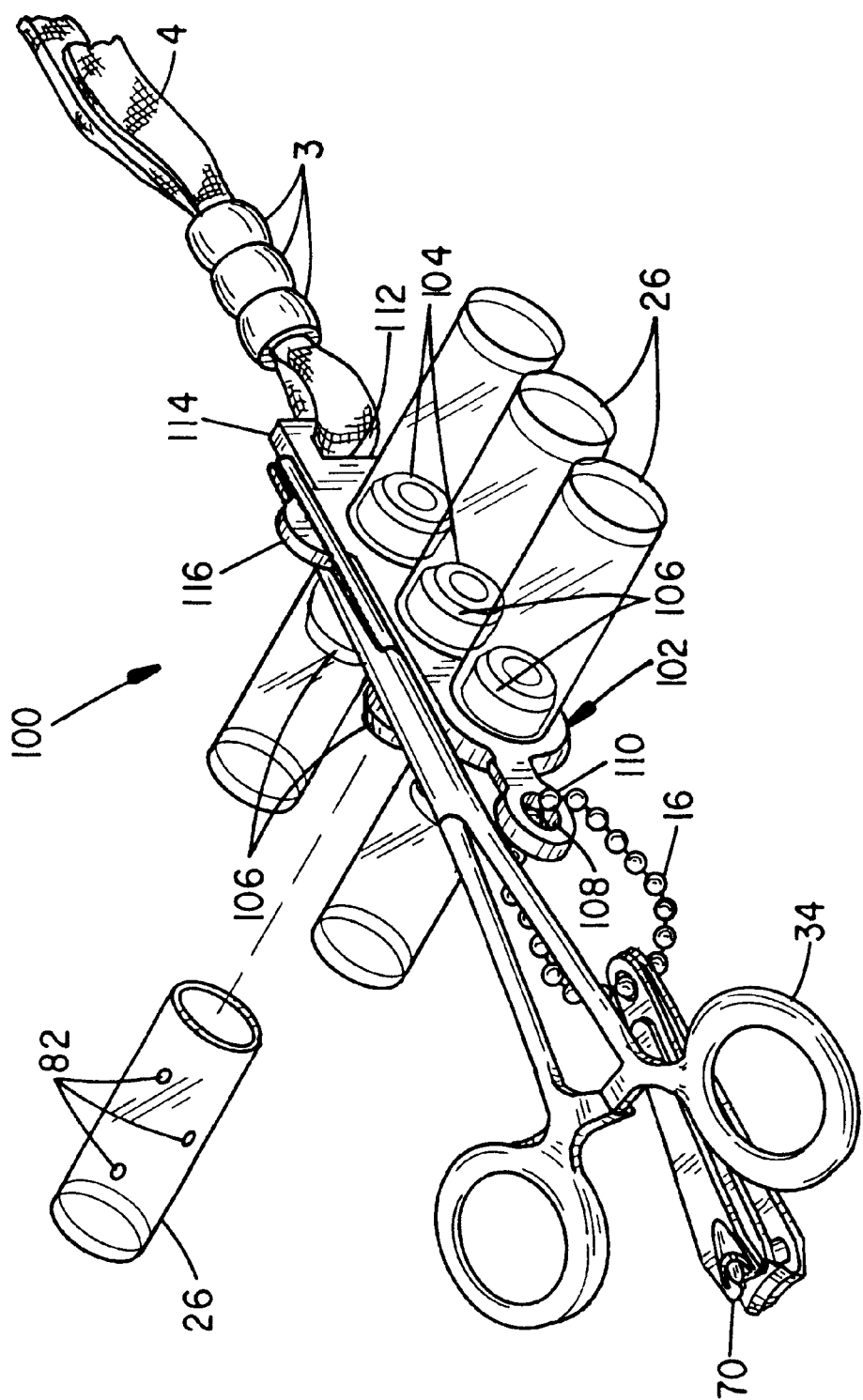
FIG. 12 shows another alternative carrier in exploded assembly that supports the storage tubes at plug ends that project from the carrier.

FIG. 6 shows another assembly 50 and carrier 51, similar to the carrier 10, but having an end loop 52 that is sized to contain a film canister 42. Two of the bores 54 are also shown with exemplary beveled, internal cap pieces 56 that mount within a tube 26 to contain the open end of a tube 26 in an annular groove space 58. The cap pieces 56 can be added to the carrier 10 to improve the retention of each tube 26 or can be used alone, such as in the fashion of the assembly 100 of FIG. 12.

Figure 7:
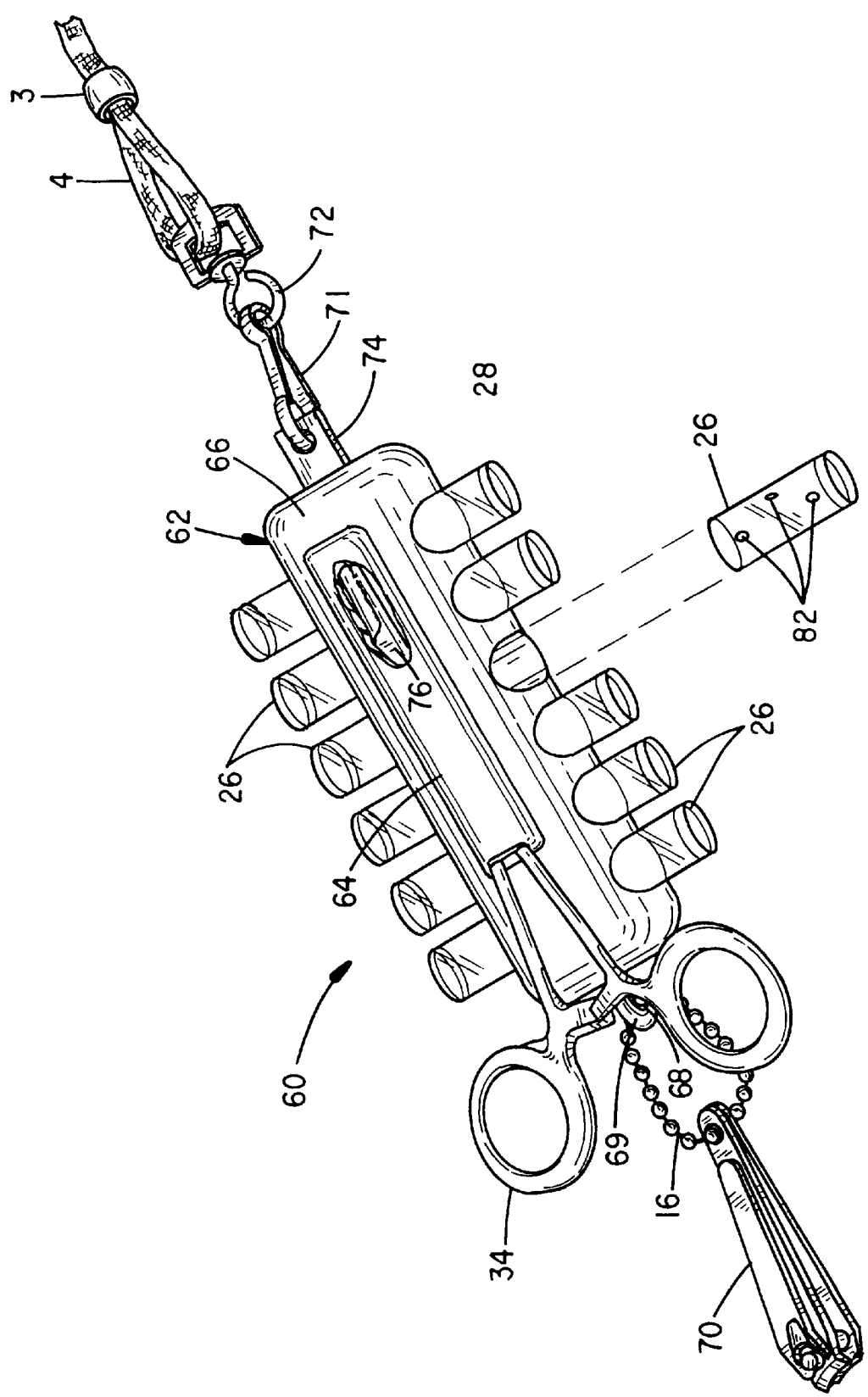
FIG. 7 is a perspective drawing shown in exploded assembly and partial cutaway to an alternative carrier having a longitudinal storage pocket.
Figure 8:
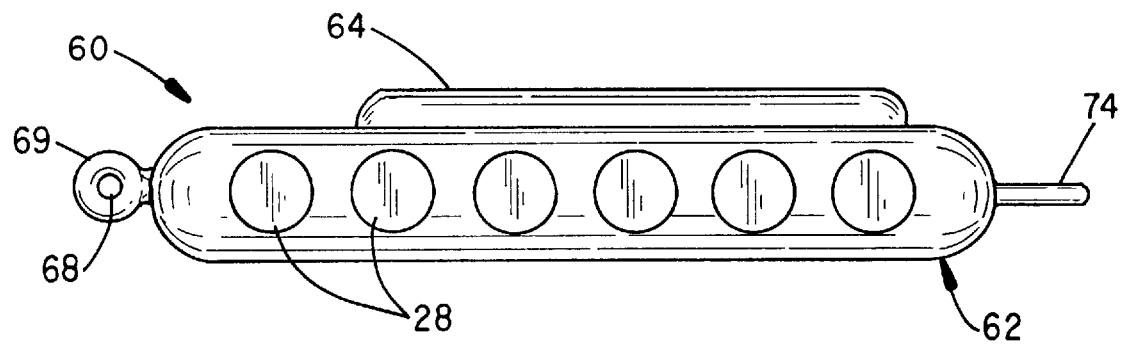
FIG. 8 shows a front view of the carrier of FIG. 7.
Figure 9:
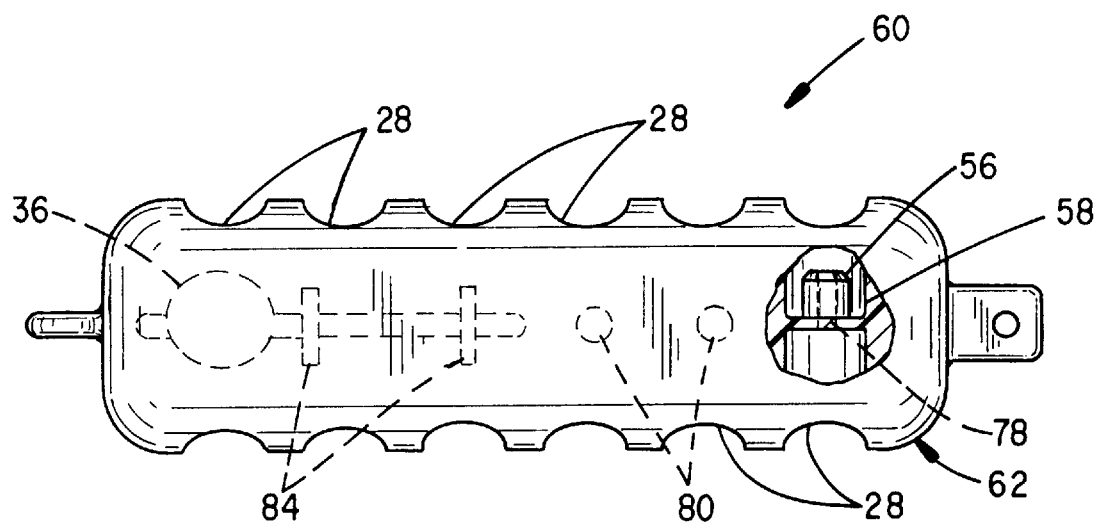
FIG. 9 shows a bottom view of the carrier of FIG. 7 in partial cutaway to expose vents and alternative tube and accessory mountings.

Another assembly 60, similar to the assemblies 2 and 50, is shown at FIGS. 7–9. A carrier 62 includes a pocket or sleeve 64 along a longitudinal surface 66 that retains a forceps 34. The sleeve 64 provides a hollow cavity space 66 to receive the forceps 34 or any other appliance inserted into the space 66. A chain 16 extends from an aperture 68 at an appending arm 69 and supports a fingernail clipper 70. A number of tubes 26 extend from the sides of the carrier 62. The lanyard 4 is secured to a retainer clip 71 and swivel 72 at an appending arm 74. A variety of other types of available retainer clips 71 that directly attach to a user can also be used without a lanyard 4.

FIG. 9 shows a cutaway portion of the carrier 62 and the construction of a cap piece 56 and annular groove 58 as it appears if included in one of the bores 28. Also shown are vent channels 78 and associated vent ports 80 that can be included at each adjoining set of bores 28 to vent moisture from the tubes 26 secured thereto. With the return of any wet items to the tubes 26, the items can rust or surface oxidation can damage the item and which conditions are overcome by allowing the moisture to vent to the atmosphere. Holes 82 might also be let into the tubes 26 to a similar effect. A long stemmed bobber 36 is shown in dashed line mounted to a pair of loops 84 that are also shown in dashed line and that might be included to depend from the bottom of the carrier 62.

FIGS. 10–13 show alternative assemblies 90 and 100. The assemblies 90 and 100 each support three tubes 26 along each side. The carrier 92 is molded to a shorter, generally similar shape to the carrier 10. A forward arm 94 supports a lanyard 4 and an aft arm 95 supports a depth measuring weight 24 at a groove 96. A chain or other tethered appliance can be secured to an aperture 97. A forceps 34 is pinched to an appendage 98 that projects from the surface of the carrier 92.

Figure 13:
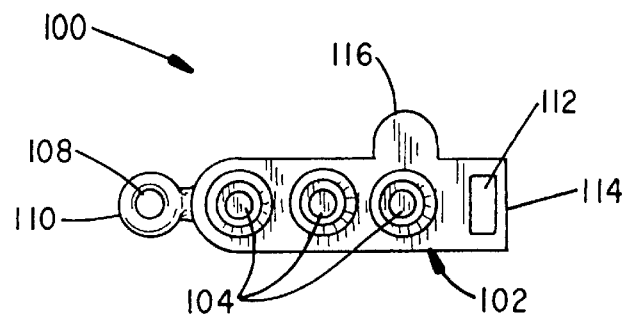
FIG. 13 shows a front view of the carrier of FIG. 12.

The assembly 100 of FIG. 13 varies from the assemblies 2, 50, 60 and 90 in that the carrier 102 provides a series of cap pieces 104 having beveled edges 106 that project from the sides of the carrier 102. A chain 16 and fingernail clipper 70 mount to an aperture 108 of an arm 110. A lanyard 4 mounts to an aperture 112 of an arm 114 and a forceps grips an appendage 116. Except for the projecting cap pieces 104, the carrier 102 is essentially flat, but can be constructed to any other desired shape.

Figure 14:
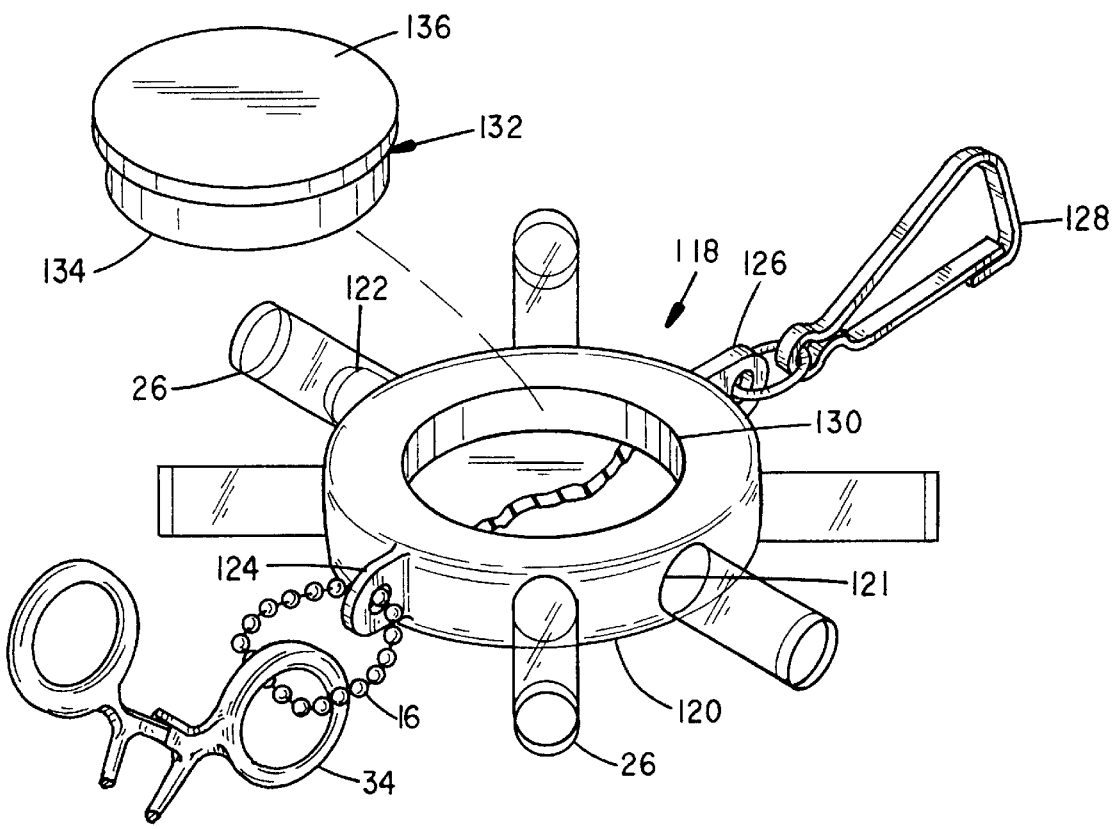
FIG. 14 shows a partial perspective drawing in exploded assembly of a disk-shaped carrier, radially extending storage containers and a live bait container.

In the latter regard and with attention to FIG. 14, an exemplary assembly 118 is shown and wherein a carrier 120 is fabricated in the form of a disk or hub. A number of storage containers 26 radiate from a series of bores 121 or cap pieces 122 that are displaced around the carrier 120. Appendages 124 and 126 support a chain 16, forceps 34 and a user retainer clip 128. A circular bore or cavity 130, which are alternately depicted by the cutaway presentation, is provided at the center of the carrier 120 and supports a live bait container 132. A base 134 of the container 132 mounts to the bore/cavity 130 and a cap 136 is exposed for removal and access to live bait contained in the container 132. For example, the container 132 might contain any of a variety of live bait such as mealworms, waxies, maggots and other grubs, fish eggs, crickets etc. The container might also contain any variety of large storage items desired by the user.

Although each of the carriers 10, 51, 62, 92, 100 and 118 are presently constructed from a silicone rubber, the carriers can be molded from a variety of plastics. A variety of different types of accessory support appendages and/or bore that support other tethered paraphernalia can be included at each carrier depending upon the typically intended user. That is and even though various constructions discussed above are intended for fisherpersons, the assemblies can be used to contain sewing accessories, electrical parts, hardware items or other small items, related tools and paraphernalia.

While the invention has been described with respect to a number of presently considered constructions and various considered modifications and improvements thereto, still other constructions may be suggested to those skilled in the art. The disclosed features might also be combined in other combinations and mounting arrangements. The invention should therefore be broadly construed within the spirit and scope of the appended claims.

What is claimed is:

1. A storage assembly comprising:
   a) a carrier body having a cross sectional dimension and having first and second opposite side walls defining said cross sectional dimension, and a plurality of adjacent bores penetrating into, but not through, at least one of said side walls,
   b) a plurality of open-ended storage containers, being tubular at their open end and having an outer diameter at said tubular end, at least slightly larger than said bores,
   whereby, said containers may be removably maintained within said bores.

2. A storage assembly as set forth in claim 1 wherein said carrier includes at least one loop that is sized to receive and support various paraphernalia to an external surface of said carrier.

3. A storage assembly as set forth in claim 1 including means exposed to the atmosphere for venting each of said containers.

4. A storage assembly as set forth in claim 1 wherein said containers include a plurality of vent holes.

5. A storage assembly as set forth in claim 1 wherein said carrier includes an aperture through at least one surface that is sized to accept and retain a separate storage container to the carrier and wherein the separate container has a detachable cover.

6. A storage assembly as set forth in claim 1 wherein said carrier includes first and second projecting arms, wherein each arm has an aperture, wherein said retainer means comprises a lanyard secured to said first arm and wherein a hand tool is secured to said second arm.

7. A storage assembly as set forth in claim 6 wherein one of said first and second arms includes a recessed groove that accepts an accessory item clipped thereto.

8. The assembly of claim 1 wherein, said carrier body, at least adjacent said bores, is made of a resilient compressible material and wherein said containers are maintained within said bores by the compressive force of the larger diameter of said containers.

9. The assembly of claim 8 wherein, said containers are removably maintained within said bores entirely by said compressive force.

10. The assembly of claim 1 wherein said carrier body includes a plurality of adjacent bores along each of said two sidewalls.

11. The assembly of claim 10 wherein said plurality of adjacent bores on one sidewall are in colinear alignment with like bores on the opposite sidewall.

12. A storage assembly as set forth in claim 1 including retainer means for securing said carrier to a user.

13. A storage assembly as set forth in claim 12 wherein said retainer means comprises a lanyard secured to said carrier.

14. A storage assembly as set forth in claim 12 wherein said carrier includes first and second projecting arms, wherein each arm has an aperture, wherein a lanyard is secured to said first arm and wherein various paraphernalia is secured to said second arm.

15. A storage assembly as set forth in claim 14 wherein one of said first and second arms includes a recessed groove that accepts an accessory item clipped thereto.

16. A storage assembly comprising:
   a) a plurality of tubular, open-ended storage containers; and
   b) a carrier having a plurality of means for closing and supporting the open end of each of said containers to said carrier and such that a portion of each container is exposed from said carrier, whereby the carrier is readily accessible for selective extraction of said containers and contents, and
   wherein said carrier is molded from an elastomer, and wherein first and second annular loops project from said carrier and are sized to contain a hand tool against an external surface of said carrier, wherein said carrier includes first and second projecting arms, and wherein a lanyard is secured to said first arm and various paraphernalia is secured to said second arm.

17. A storage assembly as set forth in claim 16 wherein an annular loop projects from said carrier that is sized to circumscribe a separate storage container adjacent an external surface of said carrier.

18. A storage assembly comprising:
   a) a carrier having a plurality of open bores and a plurality of projecting appendages;
   b) a plurality of transparent, open-ended cylindrical storage containers, wherein each container is sized to detachably mount in one of said bores and such that a portion of each container is exposed from said carrier to display the contents of each container; and
   c) retainer means for supporting said career to a user, whereby the carrier and contents of each said containers are selectively accessible and
   wherein said carrier is molded from an elastomer and wherein a plurality of annular loops project from said carrier that are sized to compressively secure various paraphernalia to an external surface of said carrier.

19. A storage assembly comprising:
   a) a carrier having a plurality of projecting appendages and including a plurality of cap pieces;
   b) a plurality of transparent, open-ended storage containers, wherein each container is sized to detachably mount to one of said cap pieces and such that a portion of each container is exposed from said carrier to display the contents of each container;
   c) retainer means for supporting said carrier to a user, whereby the carrier and contents of said containers are selectively accessible; and
   d) wherein said carrier is molded from an elastomer, wherein a lanyard is secured to one of said appendages and said other appendages are configured to support hand tools and various paraphernalia complementary to the contents of said containers.

20. A storage assembly comprising:
   a) a carrier body having a cross sectional dimension and having first inner and second opposite side walls defining said cross sectional dimension, and a plurality of adjacent bores penetrating into, but not through, at least one of said outer walls, b) a plurality of open-ended storage containers, being tubular at their open end and having an outer diameter at said tubular end, at least slightly larger than said bores, whereby, said containers may be removably maintained within said bores.

21. The assembly of claim 20 wherein said body inner and outer sidewalls are generally concentric.

22. The assembly of claim 20 wherein, said carrier body, at least adjacent said bores, is made of a resilient compressible material and wherein said containers are maintained within said bores by the compressive force of the larger diameter of said containers.

23. The assembly of claim 22 wherein, said containers are removably maintained within said bores entirely by said compressive force.

24. The assembly of claim 20 wherein said carrier body includes a plurality of adjacent bores along each of said two sidewalls.

25. The assembly of claim 24 wherein said plurality of adjacent bores on one sidewall are in colinear alignment with like bores on the opposite sidewall.

26. A storage assembly comprising:

a) carrier body having a cross sectional dimension and having first inner and second opposite side walls defining said cross sectional dimension, and a plurality of adjacent bores penetrating into, but not through, in the body between said outer walls, b) a plurality of open-ended storage containers, being tubular at their open end and having an outer diameter at said tubular end, at least slightly larger than said bores, whereby, said containers may be removably maintained within said bores.

27. The assembly of claim 26 wherein said carrier body includes a plurality of adjacent bores along each of said two sidewalls.

28. The assembly of claim 26 wherein said plurality of adjacent bores on one sidewall are in colinear alignment with like bores on the opposite sidewall.

29. The assembly of claim 26 wherein, said carrier body, at least adjacent said bores, is made of a resilient compressible material and wherein said containers are maintained within said bores by the compressive force of the larger diameter of said containers.

30. The assembly of claim 29 wherein, said containers are removably maintained within said bores entirely by said compressive force.

* * * * *